United States Patent [19] [11] 4,320,929
Clark et al. [45] Mar. 23, 1982

[54] SEALED BEARING SYSTEM FOR HYDRAULICALLY OPERATED DEVICES

[75] Inventors: Wallace Clark; Albert S. Goldstein, Jr., both of Indianapolis, Ind.

[73] Assignee: Oncor Corporation, Houston, Tex.

[21] Appl. No.: 179,819

[22] Filed: Aug. 20, 1980

[51] Int. Cl.³ .............................................. F16C 19/10
[52] U.S. Cl. .................................... 308/230; 308/233
[58] Field of Search ............ 308/230, 233, 228, 187.1, 308/229, 219

[56] References Cited

U.S. PATENT DOCUMENTS

| | | | |
|---|---|---|---|
| 3,449,030 | 6/1969 | Tiraspolsky et al. | 308/230 |
| 3,894,818 | 7/1975 | Tschirky | 308/230 |
| 4,079,672 | 3/1978 | Gasser et al. | 308/233 |
| 4,269,460 | 5/1981 | Orain | 308/233 |

Primary Examiner—Lenard A. Footland
Attorney, Agent, or Firm—Frost & Jacobs

[57] ABSTRACT

A sealed bearing system for rotatably journaling a shaft relative to a surrounding housing by means of bearing assemblies each comprising a pocket secured to the housing and a bearing support secured to the shaft, the bearing support extending into the pocket with bearings interposed between the bearing support and the walls of the pocket; a lubricant is sealed in the pocket by sealing rings extending between the bearing support and the walls of the pocket; the bearing assemblies are provided in opposing pairs with flow restrictor means lying between the bearing assemblies, thereby forming a system which permits fluid flow between the shaft and the housing but which seals the bearings from infiltration of the fluid irrespective of pressure variation in the flowing fluid.

15 Claims, 3 Drawing Figures

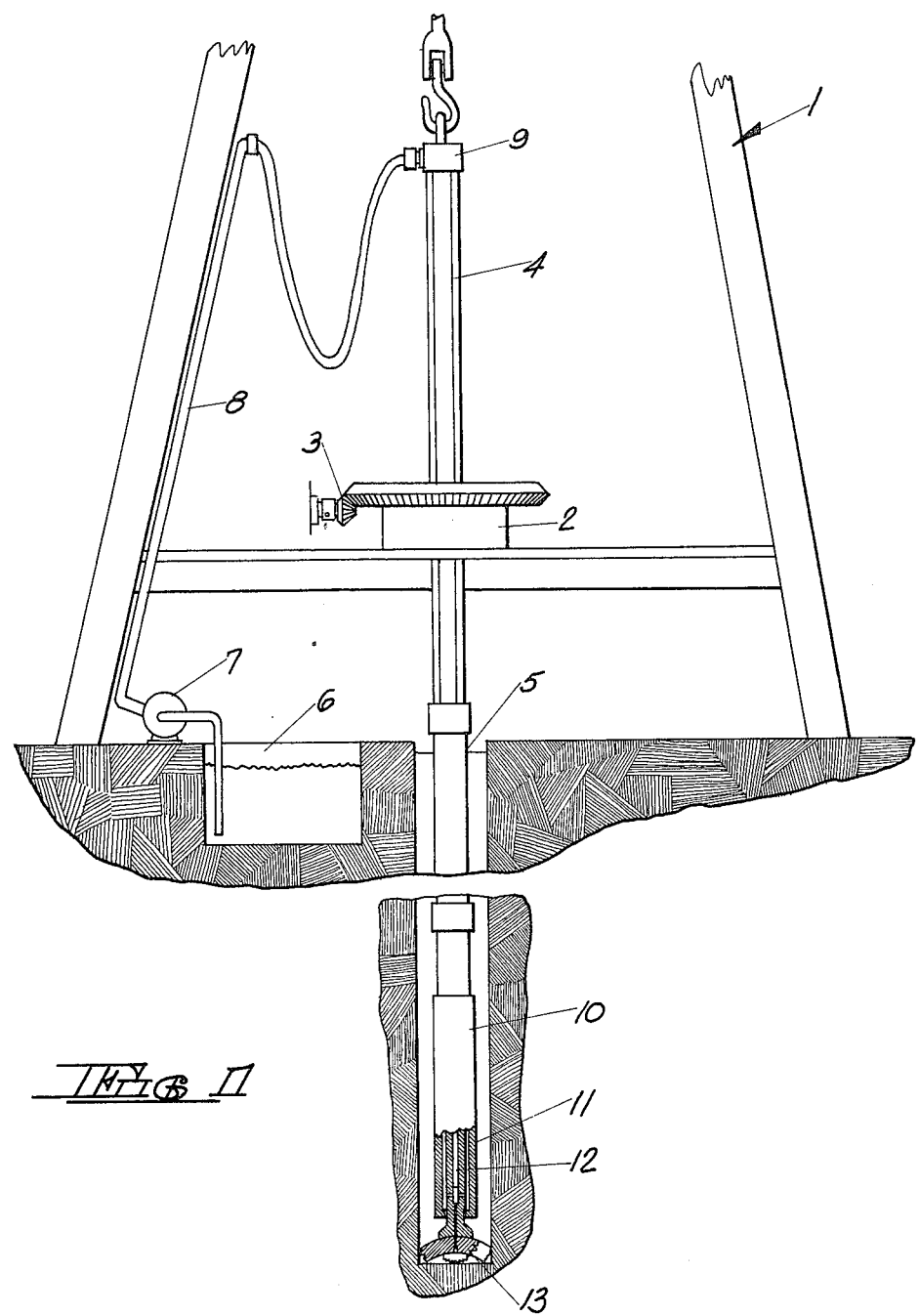

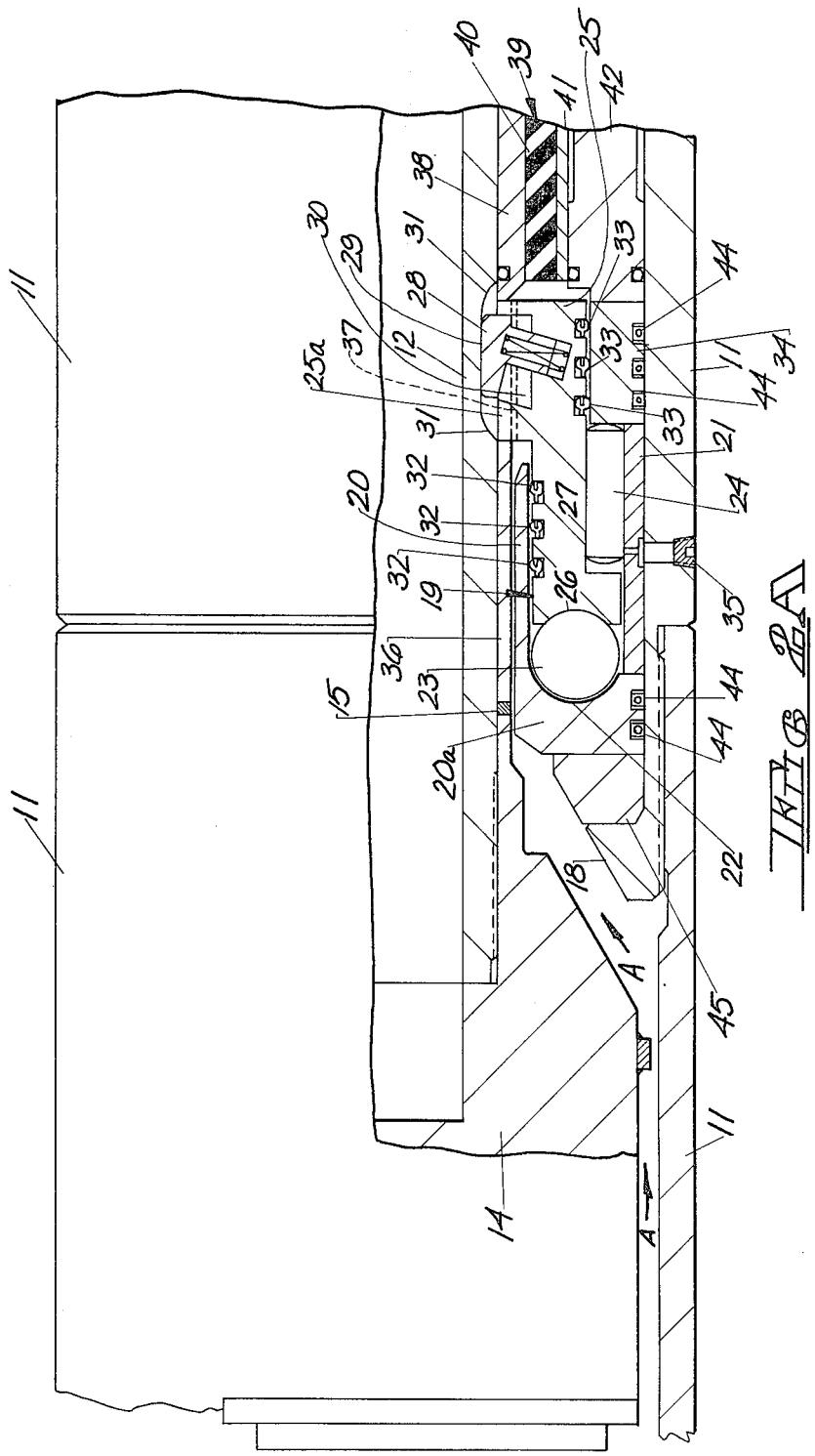

SEALED BEARING SYSTEM FOR HYDRAULICALLY OPERATED DEVICES

This invention relates to a unique arrangement of bearings and seals for supporting rotating shafts in hydraulically operated devices, such as an oil well drill.

BACKGROUND OF THE INVENTION

Hydraulically operated devices to accomplish work, such as well drilling, earth boring, pumping, the cutting of metals or other solid materials, and hammering or milling operations, whether above or below water, normally utilize a rotating shaft, or in some cases a reciprocating shaft, mounted within a housing and supported by thrust bearings to drive the drill bit or other tool. The bearings are preferably lubricated by a lubricating material other than the ambient materials utilized to drive the shaft, such as the conventional drilling mud utilized to power a downhole motor driving a drill bit. Where a lubricant, such as grease, is used, the sealing of the lubricated bearings from infiltration of foreign matter as well as the drilling mud or other fluid being transported has been a frustrating and costly problem. While newly developed lubricants which are resistant to flowing water have been helpful in a limited way, as have improved sealing materials and seal designs, the seals are costly and form a fragile sealing system except perhaps when handling abrasive free fluids which are highly lubricous. The net result has been that the useful life of the bearings and seals have been limited, their life expectancy usually being in the neighborhood of 100 hours or less depending upon the contaminants which are encountered.

A potential solution of these problems as well as the problems caused by leakage through the seals and the lubricated areas is to replace the usual lubricated bearing area having seals at both ends with a "no pass-through" system wherein there can be no infiltrating flow of fluids irrespective of pressure drops between the seals in one direction or the other to wash out lubricants and introduce foreign matter. Such "no pass-through" arrangements contemplate the maintenance of balanced pressures on opposite sides of the seals, and while such systems have been tried, they have not been satisfactory due to the inability to maintain balanced pressures on the seals during operation. As a result, such arrangements are short in life and have not solved the basic problem of increasing the useful life of the bearings and their seals.

In contrast to the foregoing, the present invention provides a unique sealed bearing system wherein the bearings are contained in sealed pockets which entrap the lubricant and effectively resist the infiltration of the pockets by contaminants, resulting in greatly enhanced useful life and reduced replacement costs.

BRIEF SUMMARY OF THE INVENTION

In accordance with the present invention, the bearings are mounted in one or more annular cups secured to the housing which surrounds the rotatable shaft, the bearings being maintained in the cup by means of a bearing support inserted in the cup, the bearing support being keyed to the shaft for rotation therewith. The bearing seals extend between the bearing support and the opposite rims of the annular cup. With this arrangement, the seals are sealing only the rims of the cup and there is no contact with the rotating shaft or direct exposure to fluid flowing axially along the shaft.

Each cup is tightly packed with a lubricant, such as silicone grease, which is effectively impervious to water. Since the seals are sealing only the rims of the cup, external fluids and contaminants cannot pass through the seals due to the lubricant which, being tightly packed, is virtually non-compressible. Thus, in the case of a well drill, a pressure drop due to the hydraulic motor exhausting through the hollow shaft or the hydraulic action of the bit nozzles as they fluctuatingly restrict fluid flow as the rock being cut crumbles, as well as back surges from the annulus from time to time, does not result in infiltration of the bearing areas or even the flow of fluid through the between-seal spaces due to the fact that the seals are isolated from the normal path of fluid flow. In addition, the seals are supported by a lubricant and hence maintain their integrity when contacted by the fluid flowing through the housing. Even as the seals wear out, contamination of the lubricant will be slow due to the fact that the grease is essentially water impervious.

The sealed bearing system of the present invention also permits leakage around the outside of the shaft to be controlled as desired to cool the inner parts of the system by providing suitable clearances between the shaft and the housing through which the fluid may flow. While excessive by-passing of drilling fluid is not advisable in that it will diminish the hydraulic power available at the bit to bore into the earth, a marine type shaft bearing may be used in the system as a leakage restrictor which will also serve as a back-up as the metallic bearings wear out.

The bearing system of the present invention is arranged to be readily assembled and disassembled, and to this end, each bearing support is provided with a spring-biased key adapted to engage a mating keyway in the shaft, the configuration of the key and keyway being such that the key will be displaced from the keyway as an incident of removing the shaft from the housing.

BRIEF DESCRIPTION OF THE DRAWINGS

FIG. 1 is a diagrammatic view of a portion of a drilling rig showing how the various parts are assembled, the drill string mounting a rotatable shaft and housing utilizing the sealed bearing system of the invention.

FIG. 2A is a side elevational view with parts broken away illustrating a sealed bearing assembly in accordance with the invention at one end of a section of housing having a hollow shaft rotatably mounted therein.

DETAILED DESCRIPTION

Figure 2B:
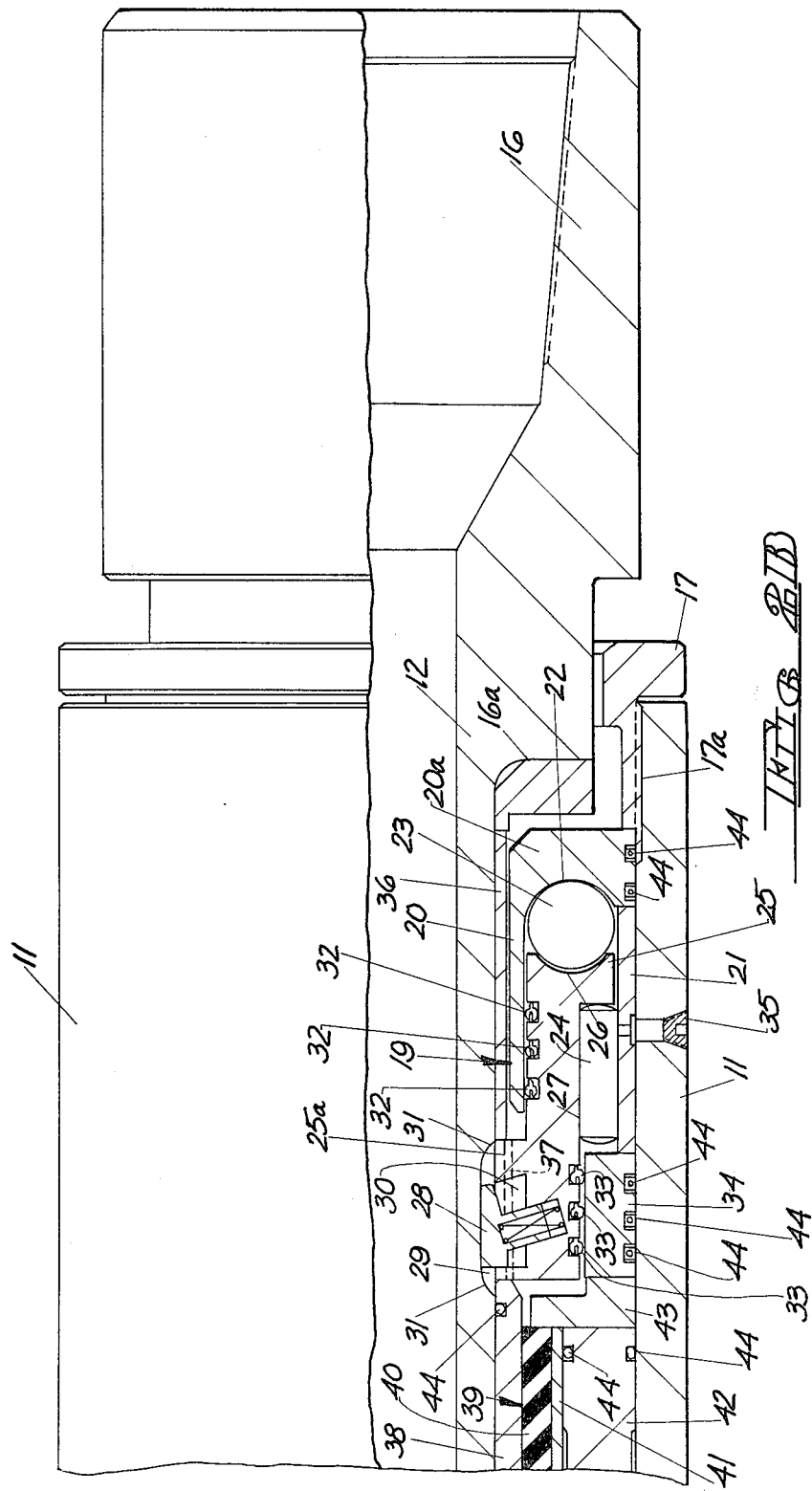
FIG. 2B is a continuation of FIG. 2A illustrating the sealed bearing assembly at the opposite or down-hole end of the housing.

Referring first to FIG. 1 of the drawings which illustrates the application of the invention to a conventional drilling rig for earth boring operations, the rig 1 has a rotatable table 2 driven by a prime mover (now shown) through bevel gear 3. A polygonal kelly 4 extends through and is keyed to the rotary table 2, the kelly mounting lengths of drill pipe 5. A supply of drilling mud is shown at 6, the drilling mud being pumped by means of a pump 7 through conduit 8 to a swivel 9 at the uppermost end of the kelly, the drilling mud flowing downwardly through the kelly into the drill pipe 5. A down-hole motor is diagrammatically indicated at 10, the motor being contained within a housing 11 secured to the drill pipe, the housing also containing a hollow drill shaft 12 which is rotatably journaled in the lower section of the housing. Upon passage through the motor, the drilling mud flows downwardly through the hollow shaft for discharge through drill bit 13. In operation, the kelly is used to connect and disconnect the lengths of drill pipe in the drill string, and it may be used to slowly rotate the drill pipe while drilling with the down-hole motor 10 in order to prevent mud from channeling in the annulus around the drill pipe, the rotary table and kelly also being used while drilling to control the reactive torque of the drilling motor.

The sealed bearing system of the present invention is designed to mount the drill shaft 12 within the housing 11, although it will be understood that the bearing system of the present invention will have applicability to any situation wherein a shaft is rotatably mounted relative to a surrounding housing, irrespective of which member is adapted to rotate relative to the other.

Referring now to FIGS. 2A and 2B in which like parts have been given like reference numerals, it being understood that the bearing assemblies at the opposite ends of the housing 11 are identical but reversed, the housing 11 at its uppermost end is threaded to an adjoining section of housing which mounts the down-hole motor 10. The upper end of the hollow drill shaft 12 is threaded to a driving head 14 by means of which the shaft 12 is rotated by the motor. The driving head seats on a compressible washer 15 which coacts through a series of spacers surrounding shaft 12 with the bit receiving socket 16 at the lowermost end of the shaft (see FIG. 2B), the socket having a shoulder 16a at its upper extremity which serves to stack the shaft contacting spacers relative to the compressible washer when the shaft is threaded onto the driving head. A nut 17 surrounds the lowermost end of the drill shaft 12 and has a threaded extension 17a in engagement with the distal end of housing 11 where it serves as a seat for the bearing system, the housing 11 having a coacting seat 18 at its opposite or upper end, as seen in FIG. 2A. The bearing system is thus contained in the housing between the seat forming nut 17 and seat 18, the various elements being stacked within the housing utilizing a series of spacers which act to hold the elements in place, the nut 17 supplying an axial force urging the assembly into contact with seat 18.

In accordance with the invention, the bearings are contained in annular pockets 19 each defined by annular pocket forming races 20 and 21, the race 20 having a lateral extension 20a defining an annular groove 22 in which the ball bearings 23 are seated, the ball bearings being positioned to act as axial thrust bearings. Roller bearings 24 are seated on the race 21 and serve as radial thrust bearings. The pocket forming races 20 and 21 are fixed relative to the housing 11 and are free from contact with drill shaft 12.

The sets of bearings 23 and 24 are maintained within the pocket by means of an annular bearing support 25 which defines an inner bearing race, the bearing support having an annular groove 26 in which the ball bearings 23 are received and a cylindrical bearing surface 27 in contact with the roller bearings 24. The bearing support 25 has an integral annular extension 25a which is fixedly secured to drill shaft 12 by means of a spring biased key 28 which engages keyway 29 in drill shaft 12, the key lying in a pocket 30 in the extension 25a. The bearing support 25 is thus affixed to shaft 12 and will rotate with the shaft. The spring bias key 28 also facilitates assembly and disassembly of the parts in that, as shaft 12 is displaced axially, the curved surfaces 31 at the opposite ends of keyway 29 act as cam surfaces to displace the key 28 inwardly against the compression of its spring, thereby freeing the key from the keyway during disassembly. During assembly, the spring will urge the key into the keyway when the parts are properly aligned.

The pockets 19 are sealed by sets of sealing rings 32 and 33 mounted on opposite sides of the bearing support 25, the sealing rings 32 being positioned to engage the pocket forming race 20 which defines one rim of the annular pocket 19, whereas the sealing rings 33 contact an annular spacer 34 which lies immediately adjacent race 21 and defines a portion of the opposite rim of pocket 19. Preferably, the seals will be formed from Teflon, although other known sealing ring materials may be utilized; and the number of seals in each set may be varied as required. As will be apparent, the seals are positioned to effectively close the inner and outer rims of the pocket 19, and the sets of bearings 23 and 24 lie within the confines of the sealed pocket.

The pockets are filled with a lubricant which is impervious to water, such as silicon grease. The lubricant is introduced into each pocket under pressure through a grease fitting 35 which communicates with the pocket through the housing 11. Preferably the grease fittings 35 will be provided in pairs so that a vacuum may be drawn on the pocket through one of the fittings and lubricant under pressure introduced through the other fitting, thereby assuring that the pocket will be completely filled with lubricant so that the lubricant will be essentially non-compressible. The bearing system is thus effectively sealed in a "no pass-through" manner against infiltration by drilling mud or other contaminants.

It must be borne in mind that while the primary flow of drilling mud is through the hollow drill shaft 12, it is nonetheless desirable to provide for leakage around the outside of the shaft 12 to cool the parts. To this end, and with reference to FIG. 2A, drilling mud will flow between the housing 11 and the driving head 14, as indicated by the arrows A. A suitable clearance will be provided between pocket forming race 20 and the drill shaft, as by means of a spacer 36, for the flow of fluid therebetween, the flow continuing through ducts 37 in the annular extension 25a of the bearing support, the fluid flowing into the intermediate area lying between the upper and lower bearing assemblies. This intermediate area is of essentially conventional construction, comprising a race 38 which is inserted between the shaft 12 and a cutless marine bearing 39 having an elastomeric liner 40 bonded to a supporting housing 41, the race 38 serving to protect the shaft 12 and also as a spacer for the marine bearing 39. The marine bearing is basically a conventional bearing used for outboard support of marine propeller shafting, but in this instance the axial grooves in the liner 40 are sized for fluid flow restriction, rather than for fluid flow for lubrication, and the liner 40 thus serves as an elastomeric flow restrictor. The bearing housing 41 is backed by a spacer 42 seated at its upper end against the spacer 34 and at its opposite or lowermost end against a spacer 43 which abuts the spacer 34 forming a part of the lower pocket, as seen in FIG. 2B. The configuration of the elastomeric flow restrictor 40 is such that fluid will flow axially along the flow restrictor to the lowermost bearing pocket, the flow progressing through the ducts 37 in the annular extension 25a of the bearing support and the passage between pocket forming race 20 and the bearing support for discharge through the lowermost end of housing 11. It will be understood that in use a countercurrent flow may be generated in the event back surges are encountered during drilling, in which event fluid flow would be in the opposite direction momentarily.

Conventional O-ring seals may be utilized at various locations, such as between the various spacers and the parts which they contact, such O-rings being indicated by the reference numeral 44. Essentially, the O-ring seals will be utilized between elements which are nonrotatable relative to each other. In the embodiment illustrated, the stacking of the parts is completed by the spacer 45 which abuts the seat 18, although the spacer 45 could be made integral with the seat, but at greater machining expense.

As should now be evident, the present invention provides a sealed bearing system in which the bearing members are effectively sealed in pockets or cavities in a manner which will effectively prevent infiltration of foreign matter and the washing away of the bearing lubricant. The location of the bearing assemblies relative to the path of fluid flow effectively resists pressure drops and the problems inherent with seals which lie in the path of fluid flow. The bearing seals contact and work against the opposing rims of the bearing pockets rather than against the bearing shaft, and the arrangement is such that the parts may be readily disassembled for repair and replacement.

Modifications may be made in the invention without departing from its spirit and purpose. For example, in the embodiment illustrated both the ball bearings 23 and the roller bearings 24 are contained within the sealed portions of the housings. Since the roller bearings provide only radial support and are subject to relatively minor forces and hence minimal wear, they could be located outside the sealed areas of the pockets, as by reversing the locations of the roller bearings and the adjoining seals 33, thereby permitting the roller bearings to be lubricated by the drilling mud rather than the grease lubricant. Such arrangement would align the sets of seals 32 and 33 on opposite sides of the cup and further enhance the integrity of the seals. Obviously caged ball or roller bearings may take the place of free bearings and rollers may be substituted for balls and vice versa, and the races for the bearings may be provided with replaceable bearing contacting inserts which can be replaced when wear occurs rather than replacing the entire race.

What is claimed is:

1. A sealed bearing assembly for rotatably journaling a shaft relative to a concentric housing surrounding said shaft, comprising an annular pocket secured to said housing, said pocket having a bottom wall and opposing side walls, bearing means in said pocket, an annular bearing support in said pocket positioned to maintain said bearing means in contact with the walls of said pocket, attachment means securing said bearing support to said shaft, and sealing means interposed between said bearing support and the opposing side walls of said pocket, whereby said housing and said shaft are rotatably mounted relative to each other and a bearing lubricant may be sealed in said pocket.

2. The bearing assembly claimed in claim 1 wherein said sealing means comprises sets of spaced apart sealing rings contacting each of the opposing walls of said pocket.

3. The bearing assembly claimed in claim 2 wherein said sealing means comprises Teflon sealing rings.

4. The bearing assembly claimed in claim 1 wherein said attachment means comprises a key mounted on said bearing support engagable with a keyway on said shaft.

5. The bearing assembly claimed in claim 4 wherein said key is spring biased into engagement with said keyway and is displaced to release said key from said keyway.

6. The bearing assembly claimed in claim 5 wherein said key and said keyway are configured to provide cam surfaces acting to displace the key from the keyway as the shaft is displaced axially relative to the housing.

7. The bearing assembly claimed in claim 1 wherein said bearing means comprises ball bearings seated on the bottom wall of said pocket.

8. The bearing assembly claimed in claim 7 wherein the bottom wall of said pocket is configured to define an annular groove in which said ball bearings are seated, said bearing support having a coacting annular groove in contact with the opposite sides of said ball bearings.

9. The bearing assembly claimed in claim 8 including roller bearings interposed between a side wall of said pocket and said bearing support, said bearing support having a cylindrical surface in contact with said roller bearings.

10. The bearing assembly claimed in claim 1 including a grease fitting in said housing in communication with said pocket for introducing lubricant into the pocket.

11. The bearing assembly claimed in claim 10 wherein a spaced apart pair of grease fittings communicate with the pocket, whereby a vacuum may be drawn on the pocket through one of said fittings and lubricant under pressure introduced under pressure through the other fitting to fully load the pocket with lubricant.

12. The bearing assembly claimed in claim 1 in combination with a second bearing assembly of like construction, said bearing assemblies lying toward the opposite ends of said housing and shaft, and flow restrictor means surrounding said shaft between said bearing assemblies.

13. The bearing assembly claimed in claim 12 wherein said housing and shaft each has a fixed seat at one end thereof and an adjustable seat at is opposite end, whereby the bearing assemblies and said flow restrictor means are stacked in said housing and on said shaft between said seats.

14. The bearing assembly claimed in claim 13 wherein the bearing assemblies are positioned with the bottoms of the pockets toward the adjacent ends of the housing.

15. The bearing assembly claimed in claim 14 including spacer means in association with said bearing assemblies and said flow restrictor means.

* * * * *